(12) United States Patent
Matsumura (10) Patent No.: US 8,264,527 B2
(45) Date of Patent: Sep. 11, 2012

(54) STEREOSCOPIC VIDEO DISPLAY APPARATUS, STEREOSCOPIC GLASSES, AND STEREOSCOPIC VIDEO DISPLAY SYSTEM

(75) Inventor: Masafumi Matsumura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/085,164

(22) Filed: Apr. 12, 2011

(65) Prior Publication Data

US 2012/0002021 A1   Jan. 5, 2012

(30) Foreign Application Priority Data

Jun. 30, 2010   (JP) ................. 2010-150062

(51) Int. Cl.
*H04N 13/04* (2006.01)
(52) U.S. Cl. ........................................... 348/51
(58) Field of Classification Search ............ 348/51
See application file for complete search history.

(56) References Cited

FOREIGN PATENT DOCUMENTS

| JP | H09-009296 | | 1/1997 |
|---|---|---|---|
| JP | H09-084057 | | 3/1997 |
| JP | H11-075223 | A | 3/1999 |
| JP | 2000-004453 | A | 1/2000 |
| JP | 2000004453 | A * | 1/2000 |
| JP | 2007-043603 | | 2/2007 |
| JP | 2009-154689 | A | 7/2009 |
| JP | 2009-302770 | | 12/2009 |

OTHER PUBLICATIONS

Notice of Rejection mailed by the Japan Patent Office on Aug. 9, 2011 in corresponding Japanese patent app. No. 2010-150062 in 5 pages.

* cited by examiner

*Primary Examiner* — Sath V Perungavoor
*Assistant Examiner* — Jeffery Williams
(74) *Attorney, Agent, or Firm* — Knobbe, Martens Olson & Bear, LLP (57) ABSTRACT

According to one embodiment, a stereoscopic video display apparatus includes a planar video display module, a stereoscopic video display module, an eyeglass control module, an operation control module, a determining module, and a switching module. The planar video display module outputs two-dimensional video. The stereoscopic video display module outputs video for left and right eyes. The eyeglass control module projects the video for left eye the left-eye portion of stereoscopic glasses and that for right eye on the right-eye portion. The operation control module receives operation information from a remote controller. The determining module determines whether a user wearing the stereoscopic glasses is operating the remote controller. The switching module selects video output from the planar video display module or from the stereoscopic video display module. When the user wearing the stereoscopic glasses is operating the remote controller, the video output from the stereoscopic video display module is displayed.

7 Claims, 8 Drawing Sheets

STEREOSCOPIC VIDEO DISPLAY APPARATUS, STEREOSCOPIC GLASSES, AND STEREOSCOPIC VIDEO DISPLAY SYSTEM

CROSS-REFERENCE TO RELATED APPLICATIONS

This application is based upon and claims the benefit of priority from Japanese Patent Application No. 2010-150062, filed Jun. 30, 2010, the entire contents of which are incorporated herein by reference.

FIELD

Embodiments described herein relate generally to a stereoscopic video display apparatus, stereoscopic glasses, and a stereoscopic video display system.

BACKGROUND

There are available stereoscopic video display apparatuses such as television broadcast receivers that are capable of providing three-dimensional video to users by using two types of videos that have disparity corresponding to the interocular distance. In such stereoscopic video display apparatuses, for example, video for right eye and video for left eye are alternately displayed. The opening and closing of a shutter for left eye and a shutter for right eye provided to stereoscopic glasses is controlled based on the timings of displaying video. That enables the user, who wears the stereoscopic glasses, to experience stereoscopic video. A technology has been known in which it is determined whether the user wears stereoscopic glasses by detecting whether a switch attached thereto is turned on or off, and video display is switched between stereoscopic (three-dimensional) video display and planar (two-dimensional) video display.

In the conventional technology, it cannot be confirmed whether the same user is wearing the stereoscopic glasses as well as operating the stereoscopic video display apparatus. Therefore, the switching between the stereoscopic video display and the planar video display may not be done in an appropriate manner. For example, assume that a user wearing the stereoscopic glasses is watching the stereoscopic video display apparatus with a user not wearing the stereoscopic glasses who is operating the remote controller of the stereoscopic video display apparatus. In that case, on-screen display (OSD) such as a user interface (UI) is (displayed as a stereoscopic video, which reduces OSD viewability.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a stereoscopic video display apparatus comprises a planar video display module, a stereoscopic video display module, an eyeglass control module, an operation control module, a determining module, and a switching module. The stereoscopic video display module is configured to output video for left eye and video for right eye. The eyeglass control module is configured to project the video for left eye on a left-eye portion of stereoscopic glasses and project the video for right eye on a right-eye portion of the stereoscopic glasses. The operation control module is configured to control operation of the stereoscopic video display apparatus based on operation information sent from a remote controller. The determining module is configured to determine whether a user wearing the stereoscopic glasses is operating the remote controller. The switching module is configured to select between video output from the planar video display module and video output from the stereoscopic video display module based on a determination result of the determining module to display the video output on a video display module. When the determining module determines that the user wearing the stereoscopic glasses is operating the remote controller, the switching module selects the video output from the stereoscopic video display module.

According to another embodiment, stereoscopic glasses, which are used with a stereoscopic video display apparatus, comprise an electrode for human body communication, a human body communication module, a determining module, and a display mode instruction module. The electrode for human body communication is located at a position in contact with a user wearing the stereoscopic glasses. The human body communication module is configured to perform human body communication, via a body of the user in contact with the electrode for human body communication, with a remote controller configured to remotely control the stereoscopic video display apparatus. The determining module is configured to determine whether the user wearing the stereoscopic glasses is operating the remote controller based on a communication state of the human body communication module. The display mode instruction module is configured to instruct the stereoscopic video display apparatus to output either two-dimensional planar video or three-dimensional stereoscopic video based on a determination result of the determining module.

According to one embodiment, a stereoscopic video display system comprises a stereoscopic video display apparatus, stereoscopic classes, and a remote controller configured to remotely control the stereoscopic video display apparatus. The stereoscopic video display apparatus comprises a planar video display module, a stereoscopic video display module, an eyeglass control module, an operation control module, and a switching module. The planar video display module is configured to output two-dimensional planar video. The stereoscopic video display module is configured to output video for left eye and video for right eye. The eyeglass control module is configured to project the video for left eye on a left-eye portion of the stereoscopic glasses and project the video for right eye on a right-eye portion of the stereoscopic glasses. The operation control module is configured to control the operation of the stereoscopic video display apparatus based on operation information sent from the remote controller. The switching module is configured to select between video output from the planar video display module and video output from the stereoscopic video display module based on display mode instruction information received from either the stereoscopic glasses or the remote controller. The stereoscopic glasses and the remote controller each comprise an electrode for human body communication and a human body communication module. The electrode for human body communication is located at a position in contact with a user of the stereoscopic glasses or the remote controller. The human body communication module is configured to perform human body communication via a body of the user in contact with the electrode for human body communication. Either the stereoscopic glasses or the remote controller includes a determining module and a sending module. The determining module is configured to determine whether the user wearing the stereoscopic glasses is operating the remote controller based on a communication state of the human body communication module. The sending module is configured to send, to the stereoscopic video display apparatus, the display mode instruction information instructing to output the planar video or stereoscopic video.

Figure 1:
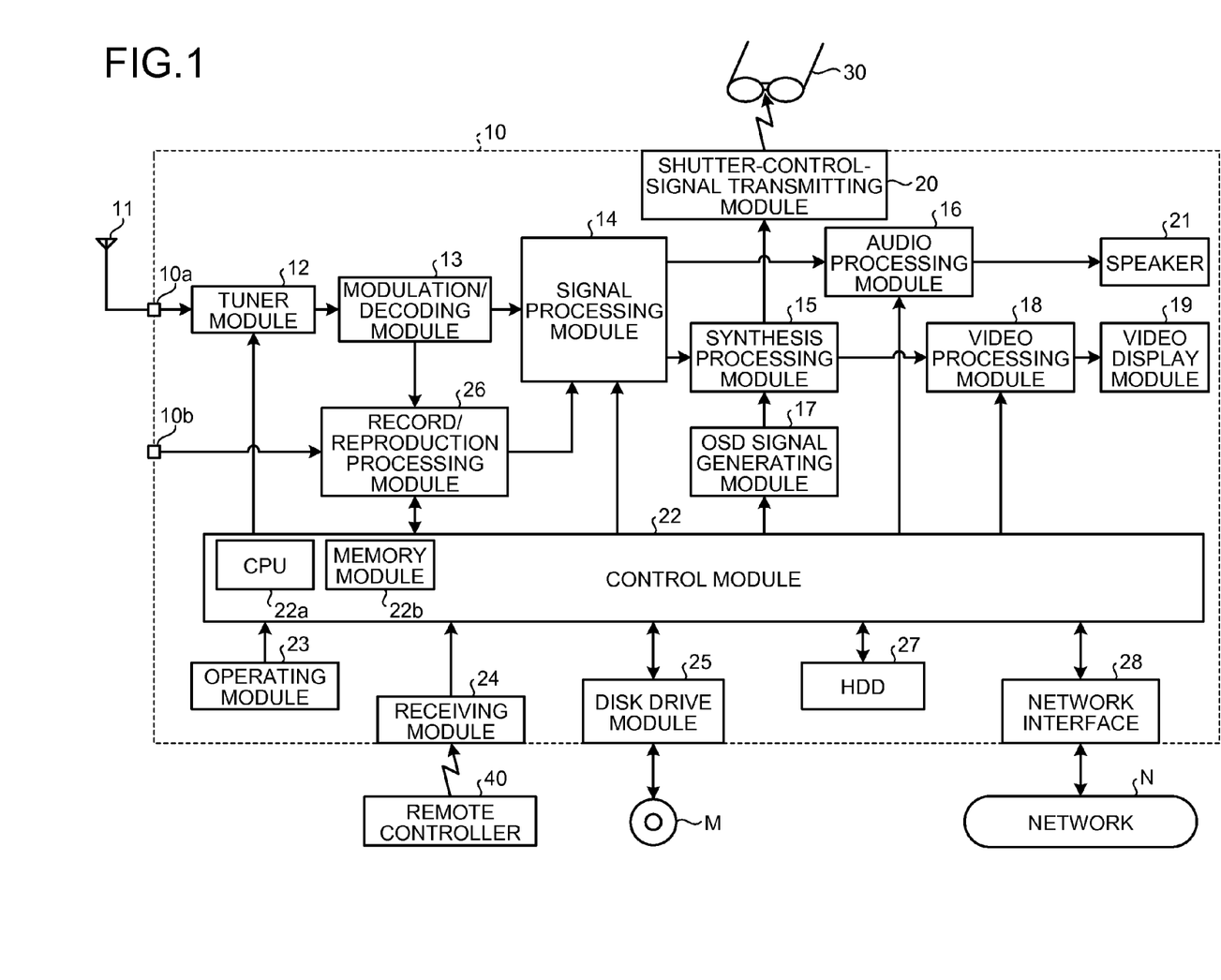
FIG. 1 is an example schematic diagram of a signal processing system of a digital television broadcast receiver according to a first embodiment.

FIG. 1 is a schematic diagram of a signal processing system of a digital television broadcast receiver 10 according to a first embodiment. The digital television broadcast receiver 10 is a video display apparatus capable of displaying video based on video signals for normal planar (two-dimensional) display and based on video signals for stereoscopic (three-dimensional) display.

The digital television broadcast signals are first received by an antenna 11 and then supplied via an input terminal 10a to a tuner module 12, at which the broadcast signal of a desired channel gets selected. The broadcast signal selected by the tuner module 12 is then supplied to a modulation/decoding module 13 for the purpose of decoding the broadcast signal into a digital video signal and a digital audio signal. Those signals are then output to a signal processing module 14.

With respect to the digital video signal as well as the digital audio signal supplied by the modulation/decoding module 13, the signal processing module 14 performs predetermined digital signal processing, which includes conversion of video signals for normal planar (two-dimensional) display into video signals for stereoscopic (three-dimensional) display or conversion of video signals for stereoscopic display into video signals for planar display. Subsequently, the signal processing module 14 outputs the digital video signal to a synthesis processing module 15 and outputs the digital audio signal to an audio processing module 16.

On the digital video signal supplied by the signal processing module 14, the synthesis processing module 15 superimposes an OSD signal that is generated by an OSD signal generating module 17 and then outputs the resultant signal. In this case, if the video signal supplied by the signal processing module 14 is a video signal for normal planar display, then the synthesis processing module 15 superimposes, without modification, the OSD signal generated by the OSD signal generating module 17 and then outputs the resultant signal.

On the other hand, if the video signal supplied by the signal processing module 14 is a video signal for stereoscopic display, with respect to the OSD signal generated by the OSD signal generating module 17, the synthesis processing module 15 performs, as described later in detail, signal processing for stereoscopic display corresponding to the video signal for stereoscopic display before superimposing the OSD signal on the input video signal and then outputs the resultant signal.

The digital video signal output by the synthesis processing module 15 is supplied to a video processing module 18, which converts the digital video signal into an analog video signal having the format displayable in a latter-state flat-screen video display module 19 that comprises, for example, a liquid display panel. The analog video signal output by the video processing module 18 is then supplied to the flat-screen video display module 19 for the purpose of video display.

A shutter-control-signal transmitting module 20 is connected to the synthesis processing module 15 for the purpose of transmitting, to a pair of stereoscopic glasses 30, a shutter control signal for left eye and a shutter control signal for right eye that are output by an eyeglass control module 159 described later. Meanwhile, there is no restriction on the communication mode implemented by the shutter-control-signal transmitting module 20 and it is possible to implement Bluetooth (registered trademark) or implement the infrared communication mode or the DLP-LINK mode.

Figure 2:
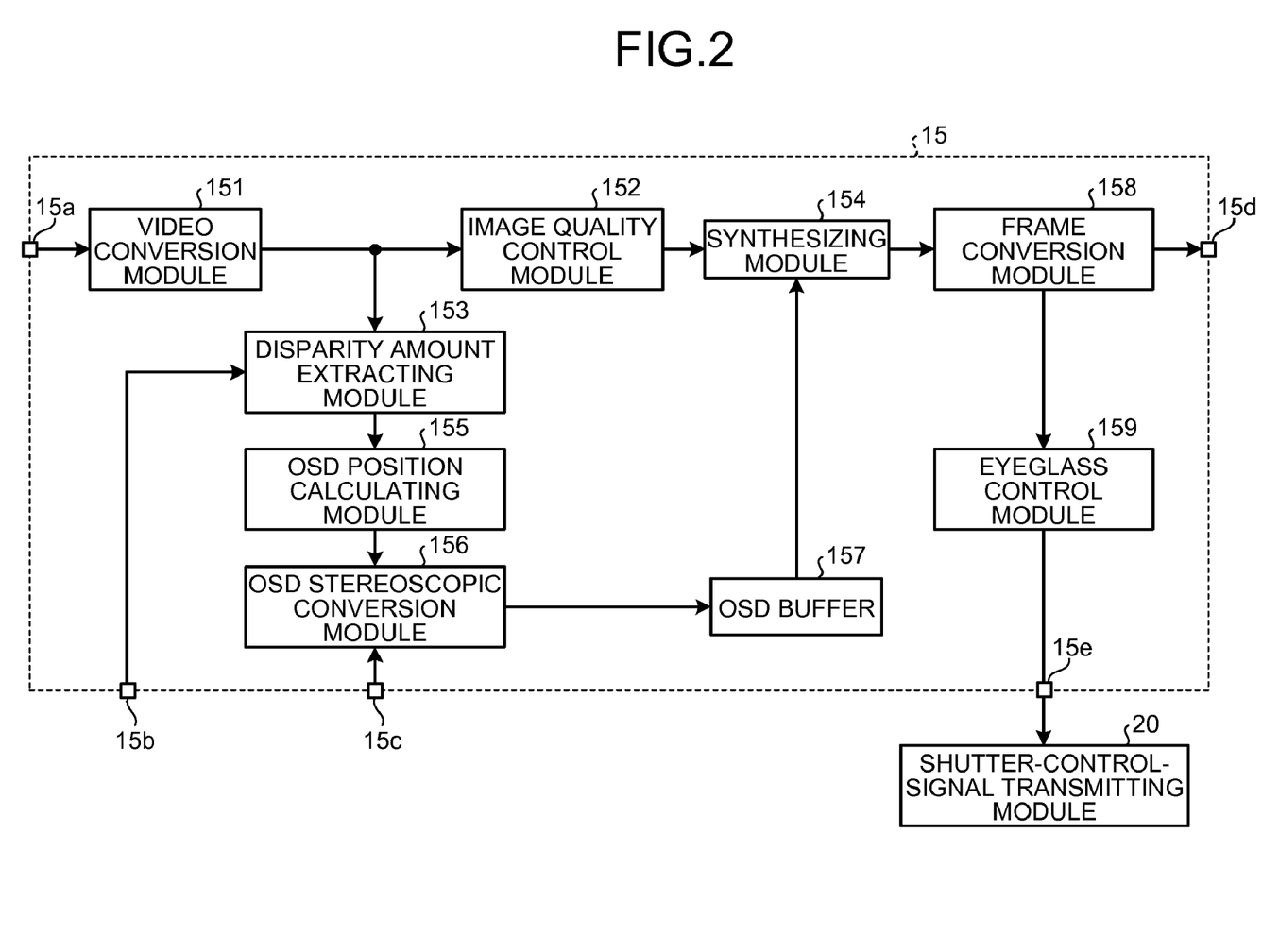
FIG. 2 is an example block diagram of a configuration of a synthesis processing module illustrated in FIG. 1 in the first embodiment.

FIG. 2 is a block diagram of a configuration of the synthesis processing module 15. The digital video signal output by the signal processing module 14 is supplied to a video conversion module 151 via an input terminal 15a. If the input video signal is a video signal for stereoscopic (three-dimensional) display, then the video conversion module 151 converts that video signal into a specific video format and outputs it to an image quality control module 152 and to a disparity amount extracting module 153.

Regarding a video signal for stereoscopic display, various video formats are available. Examples of the video formats include a frame packing format and a side-by-side format. In the frame packing format, within a single frame synchronization period, a video frame for right eye is transmitted after a video frame for left eye. In the side-by-side format, within a single horizontal period, a video line for right eye is transmitted after a video line for left eye. In addition, for the video formats, there exists a variety regarding the video size or the scanning method (interlace/progressive), and the like.

Thus, in the present embodiment, it is assumed that the video conversion module 151 performs appropriate processing such as scaling or interlace/progressive (IP) conversion with respect to a video signal for stereoscopic display that has been input. As a result, the video signal is converted into a video format of the frame packing type of a predetermined size (for example, 1920 pixels in horizontal direction×1080 lines in vertical direction) and synchronized to a vertical synchronization signal before being output to the image quality control module 152 and to the disparity amount extracting module 153.

With respect to the input video signal, the image quality control module 152 performs brightness adjustment, contrast adjustment, and hue adjustment under the control of a control module 22, and then synchronizes the video signal to the vertical synchronization signal before outputting it to a synthesizing module 154.

Meanwhile, with respect to the video signal for stereoscopic display that has been converted into the video format of the frame packing type by the video conversion module 151, the disparity amount extracting module 153 performs comparison between the frame for left eye and the frame for right eye, and extracts a disparity amount.

During the disparity extraction operation performed by the disparity amount extracting module 153, on the basis of the position of an object displayed in the frame for left eye, the horizontal shift in the position of the same object displayed in the frame for right eye is represented in the form of a pixel count. The disparity extraction operation can be performed without difficulty by making use of the technology of motion vector for detecting the shifting positions of the same object displayed in consecutive frames. More particularly, numbers are assigned from left to right to the pixels arranged in the horizontal direction on the screen. Then, from the number of the pixel at a predetermined position of a particular object displayed in the frame for left eye, the number of the pixel at the same predetermined position of that particular object displayed in the frame for right eye is subtracted so that the disparity therebetween can be represented in the form of a pixel count.

In this case, when the disparity is a negative value, it means that the video for right eye lies on the right-hand side than the video for left eye and the corresponding object is formed deep in the screen. On the other hand, when the disparity is a positive value, it means that the video for right eye lies on the left-hand side than the video for left eye and the corresponding object is formed in front of the screen.

Besides, according to a control signal that is input from the control module 22 via an input terminal 15b, the disparity amount extracting module 153 sets the disparity amount to zero value. In the state when the disparity amount is set to zero value, the video for left eye and the video for right eye lie at the same position and the video is formed as a planar (two-dimensional) video on the screen.

The disparity amount extracted by the disparity amount extracting module 153 is supplied to an OSD position calculating module 155, which performs disparity-amount-based calculation for correcting the display position at the time of displaying the OSD in a stereoscopic manner and then outputs a disparity control signal indicating the calculation result.

More particularly, in the state in which the disparity amount extracted by the disparity amount extracting module 153 does not vary in the temporal axis direction or in the video display state in which the disparity amount is moderately varying in the temporal axis direction, the OSD position calculating module 155 performs calculation for correcting the display position at the time of displaying the OSD in a stereoscopic manner. That is, when the disparity amount is drastically varying in the temporal axis direction, the video is in the state of drastically moving in the depth direction. In that state, the user is indulged in watching the video. Hence, in case the superimposing OSD also drastically varies in the depth direction, then the video becomes visually undesirable. For that reason, in the state in which the disparity amount is drastically varying, the OSD position calculating module 155 outputs a disparity control signal indicating the result that was calculated when the disparity amount had a smaller variation. Meanwhile, in the state in which the disparity amount is zero value, the display position is not subjected to any correction.

The disparity control signal output by the OSD position calculating module 155 is then supplied to an OSD stereoscopic conversion module 156. Besides, the OSD signal generated by the OSD signal generating module 17 is also supplied to the OSD stereoscopic conversion module 156 via an input terminal 15c. Based on the disparity control signal, the OSD stereoscopic conversion module 156 generates an OSD signal for left eye, which is to be superimposed on the video frame for left eye, and generates an OSD signal for right eye, which is to be superimposed on the video frame for right eye, from the OSD signal input thereto, and stores those OSD signals in an OSD buffer 157.

Subsequently, the video signal synthesized by the synthesizing module 154 is supplied to a frame conversion module 158. In the frame conversion module 158, the vertical synchronization frequency of the video signal is converted to be a double frequency, i.e., the frame frequency of the video signal is doubled in speed. Then, the video signal is output through an output terminal 15d to the video display module 19 via the video processing module 18. Consequently, in the video display module 19, the video frame for right eye and the video frame for left eye are alternately displayed.

Moreover, a frame synchronization signal generated by the frame conversion module 158 is supplied to the eyeglass control module 159, which generates a shutter control signal for left eye and a shutter control signal for right eye based on the frame synchronization signal and then outputs the shutter signals through an output terminal 15e to the stereoscopic glasses 30 via the shutter-control-signal transmitting module 20. Thus, in the stereoscopic glasses 30, a shutter for left eye 30a (described later) and a shutter for right eye 30b (described later) are alternately opened and closed in synchronization with the frame synchronization signal.

That is, the eyeglass control module 159 performs control in such a way that, when the video for left eye is being displayed, the shutter for the right eye (i.e., the shutter for right eye 30b described later) is closed, while when the video for right eye is being displayed, the shutter for the left eye (i.e., the shutter for left eye 30a described later) is closed. That enables the user to experience a stereoscopic video.

Herein, the stereoscopic glasses 30 are of the liquid-crystal shutter type that are worn by the user watching stereoscopic videos. The explanation regarding the stereoscopic glasses 30 is given below with reference to FIGS. 3 and 4.

Figure 3:
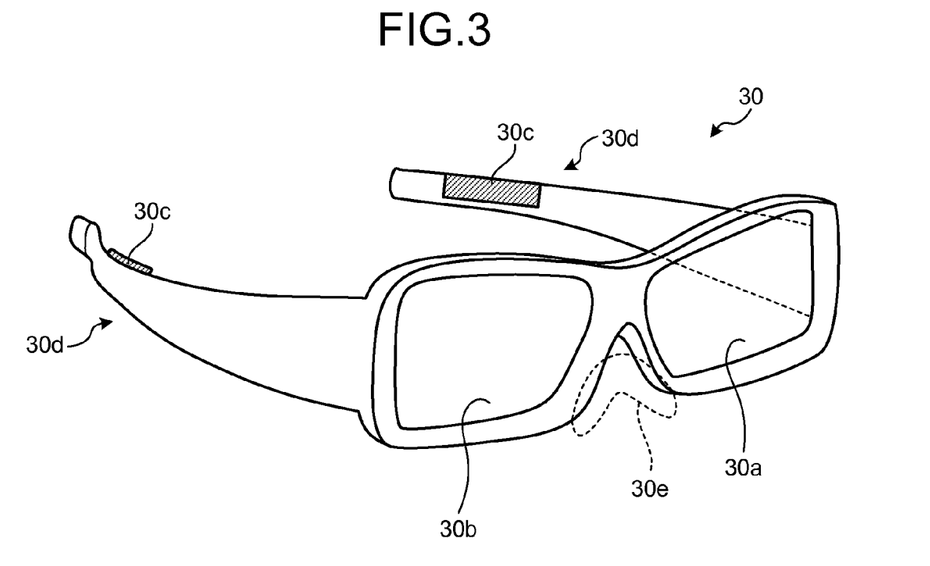
FIG. 3 is an example schematic diagram of an exterior configuration of stereoscopic glasses illustrated in FIG. 1 in the first embodiment.

FIG. 3 is a schematic diagram of an exterior configuration of the stereoscopic glasses 30. As illustrated in FIG. 3, the shutter for left eye 30a is provided on the portion covering the left eye of the user wearing the stereoscopic glasses 30, while the shutter for right eye 30b is provided on the portion covering the right eye of the user wearing the stereoscopic glasses 30.

Moreover, electrodes 30c for human body communication are provided at the positions on the stereoscopic glasses 30 in contact with the body (facial region) of the user wearing the stereoscopic glasses 30. In the example of FIG. 3, the electrodes 30c are provided to temple pieces (sides) 30d of the stereoscopic glasses 30. However, alternatively, it is also possible to provide the electrodes 30c to a pad portion (nose pad) 30e of the stereoscopic glasses 30.

Figure 4:
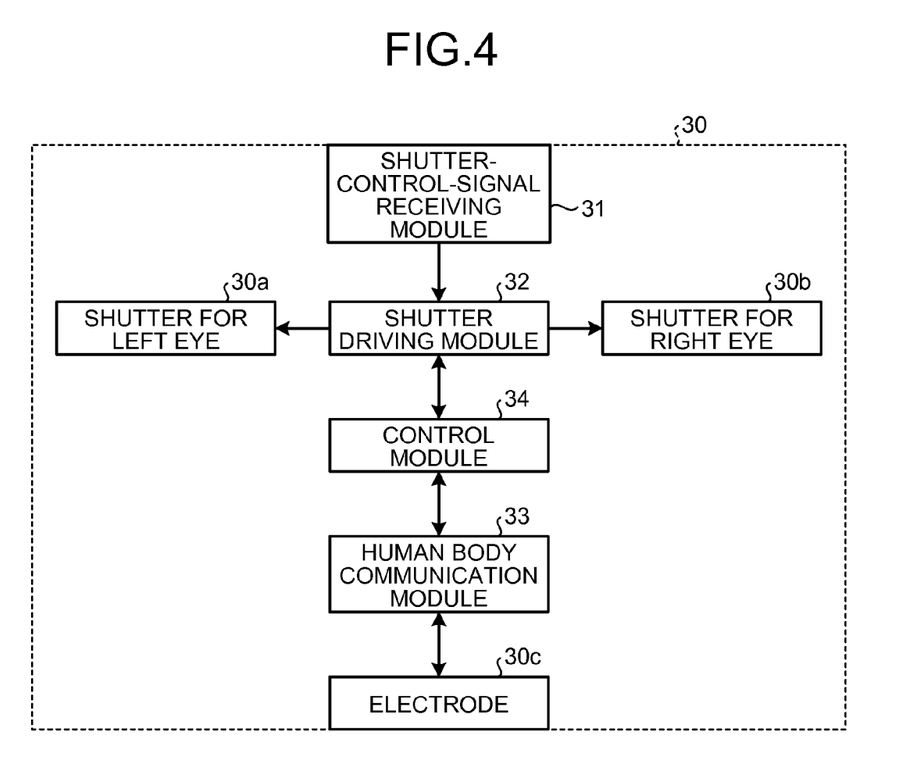
FIG. 4 is an example block diagram of a configuration of the stereoscopic glasses illustrated in FIG. 1 in the first embodiment.

FIG. 4 is a block diagram of a configuration of the stereoscopic glasses 30. As illustrated in FIG. 4, the stereoscopic glasses 30 comprises a shutter-control-signal receiving module 31, a shutter driving module 32, a human body communication module 33, and a control module 34.

The shutter-control-signal receiving module 31 receives the shutter control signal for left eye and the shutter control signal for right eye that have been transmitted by the shuttercontrol-signal transmitting module 20. According to the shutter control signals input via the shutter-control-signal receiving module 31, the shutter driving module 32 alternately opens and closes the shutter for left eye 30a and the shutter for right eye 30b for the purpose of actualizing the transmissive state and the non-transmissive state of the video (light).

That is, depending on the video displayed on the video display module 19, the shutter driving module 32 changes the state of the shutter for left eye 30a and the shutter for right eye 30b in such a way that only the video for left eye is projected to the left eye and only the video for right eye is projected to the right eye. Herein, if the video for left eye as well as the video for right eye is a stereoscopic video with consideration given to the disparity, then the user wearing the stereoscopic glasses 30 becomes able to experience the spatial effects with respect to the video displayed on the video display module 19.

The human body communication module 33 is a functional module to perform human body communication by making use of the human body, with which the electrodes 30c illustrated in FIG. 3 have made contact, as the transmission path for human body communication and by communicating via the transmission path with another human body communication module (human body communication module 43) connected thereto. More particularly, via the body of the user with which the electrodes 30c have made contact, the human body communication module 33 performs human body communication with the human body communication module 43 (described later) of a remote controller 40 touched (held) by the same user. Meanwhile, there is no restriction on the transmission mode implemented for human body communication and it is possible to implement either the current mode or the voltage mode.

The control module 34 comprises a microprocessor such as a central processing unit (CPU) and comprises a memory for storing programs that are executable by the microprocessor. The control module 34 comprehensively controls the operations of the constituent elements of the stereoscopic glasses 30. More particularly, the control module 34 monitors the conductive state of the electrodes 30c of the stereoscopic glasses 30 and determines whether the user wears the stereoscopic glasses 30. Moreover, upon confirming that the stereoscopic glasses 30 are worn, the control module 34 sends an existence confirmation command via the human body communication module 33 so that communication is established with the remote controller 40.

Once communication with the remote controller 40 is established, the configuration can be such that predetermined information is sent to the remote controller 40. For example, the configuration can be such that identification information such as the product information unique to the stereoscopic glasses 30 or state information such as the driving state of the shutter driving module 32 is sent to the remote controller 40.

Returning to the explanation with reference to FIG. 1, the audio processing module 16 converts the digital audio signal, which has been input from the signal processing module 14, into an analog audio signal having the format that can be regenerated in a speaker 21 (described later). The analog audio signal output by the audio processing module 16 is then supplied to the speaker 21 for the purpose of audio playback.

In the digital television broadcast receiver 10, all operations including the abovementioned various receiving operations are comprehensively controlled by the control module 22, which houses therein a CPU 22a. Upon receiving operation information from an operating module 23 installed in the main body of the digital television broadcast receiver 10 or upon receiving operation information that has been transmitted by the remote controller 40 and received by a receiving module 24, the control module 22 controls the constituent elements in such a way that the contents in the received operation information are reflected.

In that case, the control module 22 makes use of a memory module 22b, which mainly comprises a read only memory (ROM) for storing control programs to be executed by the CPU 22a, a random access memory (RAM) for providing a work area to the CPU 22a, and a nonvolatile memory for storing a variety of configuration information and control information.

To the control module 22 is connected a disk drive module 25, which is used to detachably attach an optical disk M such as a digital versatile disk (DVD) and which has the function of performing reading/writing of digital data with respect to the attached optical disk M.

Based on the user operations using the operating module 23 or the remote controller 40, the control module 22 can perform control in such a way that the digital video signal and the digital audio signal obtained from the modulation/decoding module 13 are encoded and converted into a predetermined recording format by a record/reproduction processing module 26 and then supplied to the disk drive module 25 for the purpose of recording in the optical disk N.

Moreover, based on the user operations using the operating module 23 or the remote controller 40, the control module 22 can perform control in such a way that the digital video signal and the digital audio signal are read from the optical disk M by the disk drive module 25, decoded by the record/reproduction processing module 26, and then supplied to the signal processing module 14 for the purpose of video display and audio playback as described above.

Meanwhile, to the control module 22 is connected a hard disk drive (HDD) 27. Based on the user operations using the operating module 23 or the remote controller 40, the control module 22 can perform control in such a way that the digital video signal and the digital audio signal obtained from the modulation/decoding module 13 are encoded and converted into a predetermined recording format by the record/reproduction processing module 26, and then recorded in the HDD 27.

Moreover, based on the user operations using the operating module 23 or the remote controller 40, the control module 22 can perform control in such a way that the digital video signal and the digital audio signal are read from the HDD 27, decoded by the record/reproduction processing module 26, and then supplied to the signal processing module 14 for the purpose of video display and audio playback as described above.

An input terminal 10b is connected to the digital television broadcast receiver 10 for the purpose of directly inputting digital video signals and digital audio signals into the digital television broadcast receiver 10 from outside. Under the control of the control module 22, the digital video signals and digital audio signals input via the input terminal 10b are supplied to the signal processing module 14 via the record/reproduction processing module 26 for the purpose of video display and audio playback as described above.

Moreover, under the control of the control module 22, the digital video signals and digital audio signals input via the input terminal 10b are processed by the record/reproduction processing module 26 and are used for the purpose of reading/writing with respect to the optical disk M by the disk drive module 25 or used for the purpose of reading/writing with respect to the HDD 27.

Meanwhile, based on the user operations using the operating module 23 or the remote controller 40, the control module 22 performs control in such a way that the digital video signals and the digital audio signals recorded in the optical disk M by the disk drive module 25 are recorded in the HDD 27, and the digital video signals and the digital audio signals recorded in the HDD 27 are recorded in the optical disk M by the disk drive module 25.

The control module 22 is also connected to a network interface 28, which is further connected to an external network N. The network interface 28 performs communication with external devices (not illustrated) via the network N. Consequently, via the network interface 28, the control module 22 becomes able to access the external devices connected to the network N for the purpose of information communication and becomes able to use the services provided by the external device.

Figure 5:
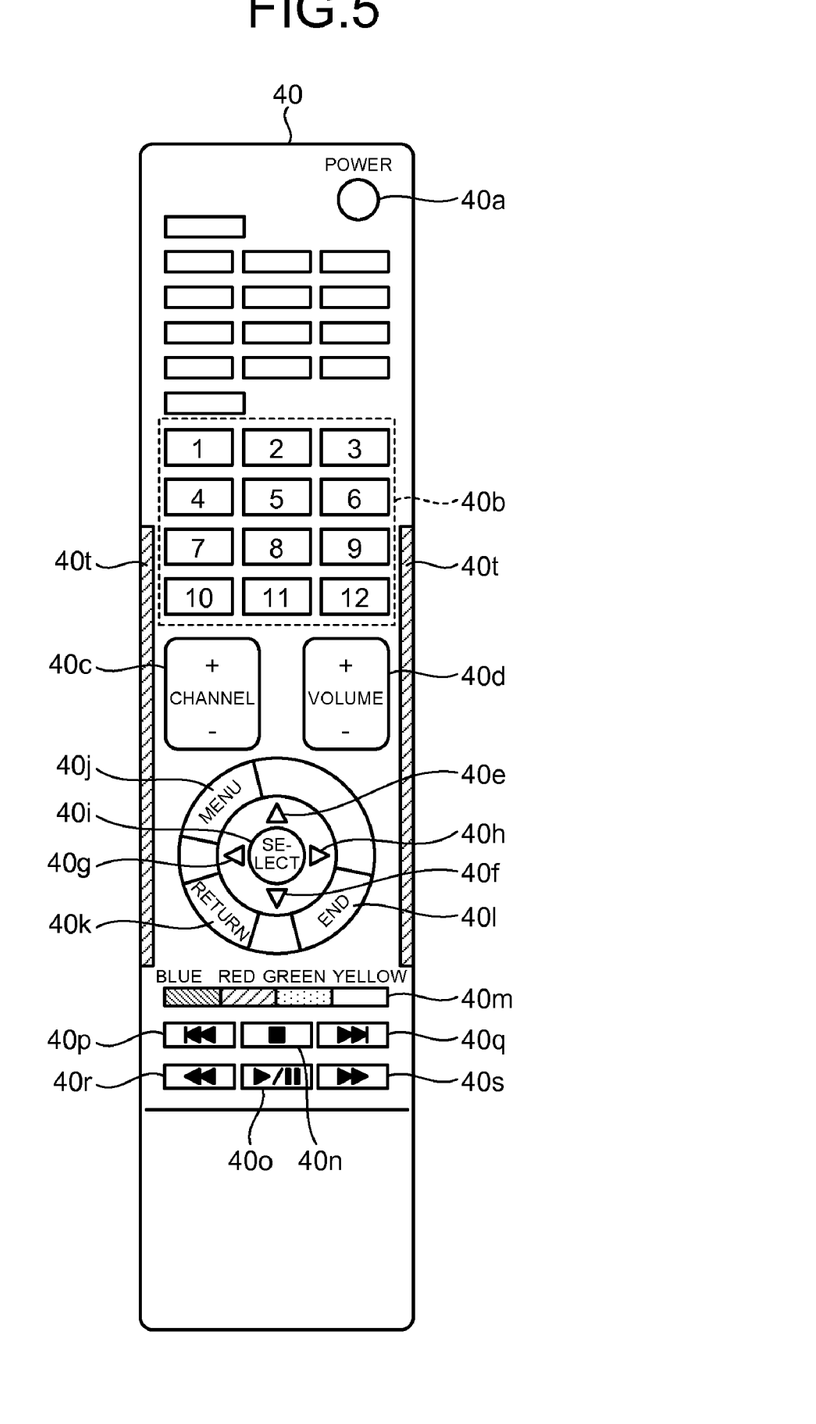
FIG. 5 is an example schematic diagram of an exterior configuration of a remote controller illustrated in FIG. 1 in the first embodiment.
Figure 6:
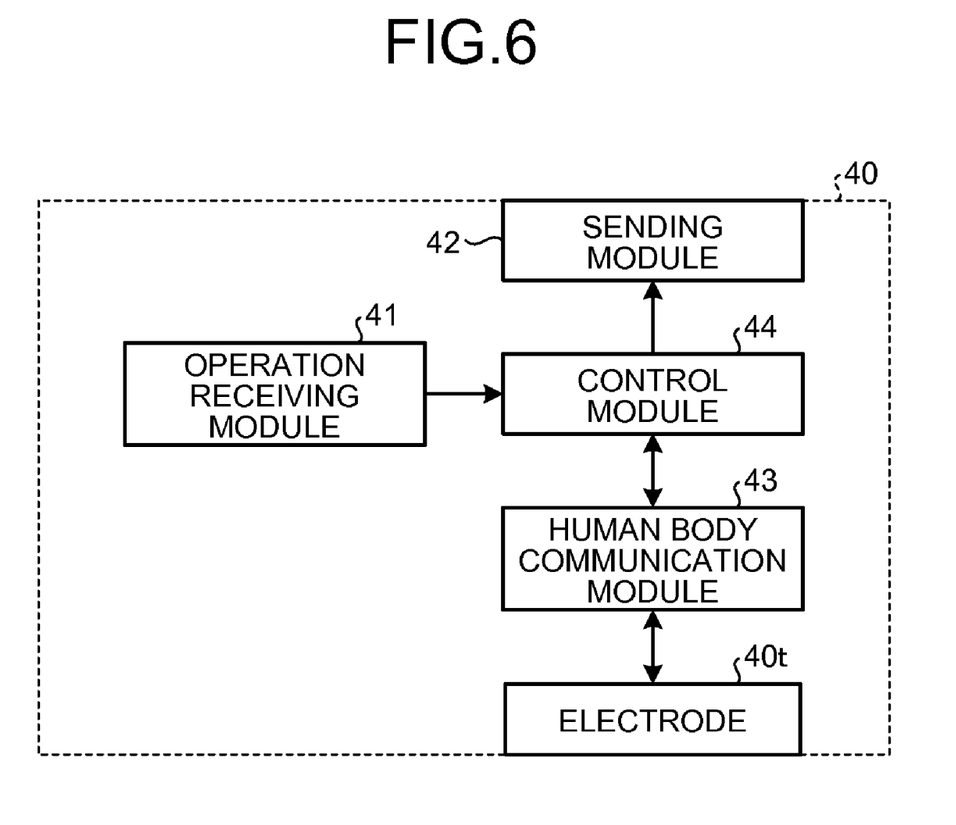
FIG. 6 is an example block diagram of a configuration of the remote controller illustrated in FIG. 1 in the first embodiment.

Explained below with reference to FIGS. 5 and 6 is a configuration of the remote controller 40. FIG. 5 is a schematic diagram of an exterior configuration of the remote controller 40.

As illustrated in FIG. 5, the remote controller 40 mainly comprises a power key 40a, a number keypad 40b, a channel selection key 40c, a volume adjustment key 40d, an up-cursor key 40e, a down-cursor key 40f, a left-cursor key 40g, a right-cursor key 40h, a select key 40i, a menu key 40j, a return key 40k, an end key 40l, and a color key 40m of four colors (blue, red, green, yellow).

Moreover, the remote controller 40 comprises a stop key 40n, a play/pause key 40o, a backward skip key 40p, a forward skip key 40q, a fast-rewind key 40r, and a fast-forward key 40s. With respect to the information in the form of video or audio obtained from the disk drive module 25 or from the HDD 27, the stop key 40n or the play/pause key 40o on the remote controller 40 can be operated to perform play, stop, and pause operations.

Similarly, by operating the backward skip key 40p or the forward skip key 40q on the remote controller 40, backward skip or forward skip can be performed during which the information in the form of video or audio being played at the disk drive module 25 or the HDD 27 can be made to skip by increments in the backward direction or in the forward direction with respect to the play direction.

Moreover, by operating the fast-rewind key 40r or the fast-forward key 40s on the remote controller 40, fast rewinding or fast forwarding can be performed during which the information in the form of video or audio being played at the disk drive module 25 or the HDD 27 can be made to continuously and speedily play in the backward direction or in the forward direction with respect to the play direction.

Meanwhile, electrodes 40t for human body communication are provided at the positions on the remote controller 40 in contact with the body (hand region) of the user operating the remote controller 40. In the example of FIG. 5, the electrodes are provided on the side surfaces of the remote controller 40. However, alternatively, it is also possible to provide the electrodes 40t on the back surface of the remote controller 40.

FIG. 6 is a block diagram of a configuration of the remote controller 40. As illustrated in FIG. 6, the remote controller 40 comprises an operation receiving module 41, a sending module 42, the human body communication module 43, and a control module 44.

The operation receiving module 41 is a functional module to receive key operations of the abovementioned keys. The sending module 42 sends predetermined signals (operation signal, stereoscopic mode instruction information, planar mode instruction information, etc.) under the control of the control module 44. Herein, the communication mode implemented by the sending module 42 is identical to that implemented by the receiving module 24 and can be a wireless communication mode such as the infrared communication mode or Bluetooth (registered trademark).

The human body communication module 43 is a functional module to perform human body communication by making use of the human body, with which the electrodes 40t illustrated in FIG. 5 have made contact, as the transmission path and by communicating via the transmission path with another human body communication module (human body communication module 33) connected thereto. More particularly, via the body of the user with which the electrodes 40t have made contact, the human body communication module 43 performs human body communication with the human body communication module 33 of the stereoscopic glasses 30 that is making contact with (that are worn by) the same user.

The control module 44 comprises a microprocessor such as a CPU and a memory for storing programs that are executable by the microprocessor. The control module 44 controls the overall operation of the remote controller 40. More particularly, according to the key operations received by the operation receiving module 41, the control module 44 sends, through the sending module 42, the operation information that includes commands assigned in advance to the keys that have been operated Moreover, the control module 44 sends an existence confirmation command via the human body communication module 43 as an attempt to establish communication with the stereoscopic glasses 30.

In the state in which communication is established with the human body communication module 33 of the stereoscopic glasses 30, when the input of a key operation is received, the control module 44 determines that the user wearing the stereoscopic glasses 30 is operating the remote controller 40. In that case, the control module 44 sends, through the sending module 42, the operation information corresponding to the key operations and the instruction information (hereinafter, referred to as "stereoscopic mode instruction information") that includes an instruction for displaying the OSD with the video signal for stereoscopic (three-dimensional) display.

On the other hand, in the state in which communication is not established with the human body communication module 33 of the stereoscopic glasses 30, when the input of a key operation is received, the control module 44 determines that a user not wearing the stereoscopic glasses 30 is operating the remote controller 40. In that case, the control module 44 sends, using the sending module 42, the operation information corresponding to the key operation and the instruction information (hereinafter, referred to as "planar mode instruction information") that includes an instruction for displaying the OSD with the video signal for planar (two-dimensional) display. Herein, the stereoscopic mode instruction information and the planar mode instruction information is collectively referred to as display mode instruction information.

Based on the operation information received via the receiving module 24 as described above, the control module 22 of the digital television broadcast receiver 10 controls the constituent elements in such a way that the contents in the received operation information are reflected. Besides, according to the contents in the display mode instruction information received along with the operation information, the control module 22 switches the output format of the OSD signal between the planar video output and the stereoscopic video output.

Meanwhile, if the stereoscopic mode instruction information is received along with the operation information, then the control module 22 instructs the disparity amount extracting module 153 of the synthesis processing module 15 to perform normal operations so that the OSD can be displayed as a stereoscopic video.

In that case, since the user operating the remote controller 40 is also wearing the stereoscopic glasses 30, displaying the OSD as a stereoscopic video makes it possible to stereoscopically project the OSD. Hence, when the stereoscopic mode instruction information is received, i.e., when the user wearing the stereoscopic glasses 30 is operating the remote controller 40, the OSD can be displayed as a stereoscopic video on the screen thereby enabling achieving enhancement in OSD viewability.

On the other hand, if the planar mode instruction information is received along with the operation information, then the control module 22 controls the disparity amount extracting module 153 of the synthesis processing module 15 and sets the disparity amount extracted by the disparity amount extracting module 153 to zero value so that the OSD can be displayed as planar video.

In that case, the user operating the remote controller 40 is not wearing the stereoscopic glasses 30. Hence, if the OSD is displayed as a stereoscopic video, then the user is forced to watch the left and right videos superimposed on each other. That may lead to deterioration in OSD viewability. Hence, when the planar mode instruction information is received, i.e., when the user not wearing the stereoscopic glasses 30 is operating the remote controller 40, the OSD is displayed as planar video on the screen thereby enabling achieving enhancement in OSD viewability.

Figure 7:
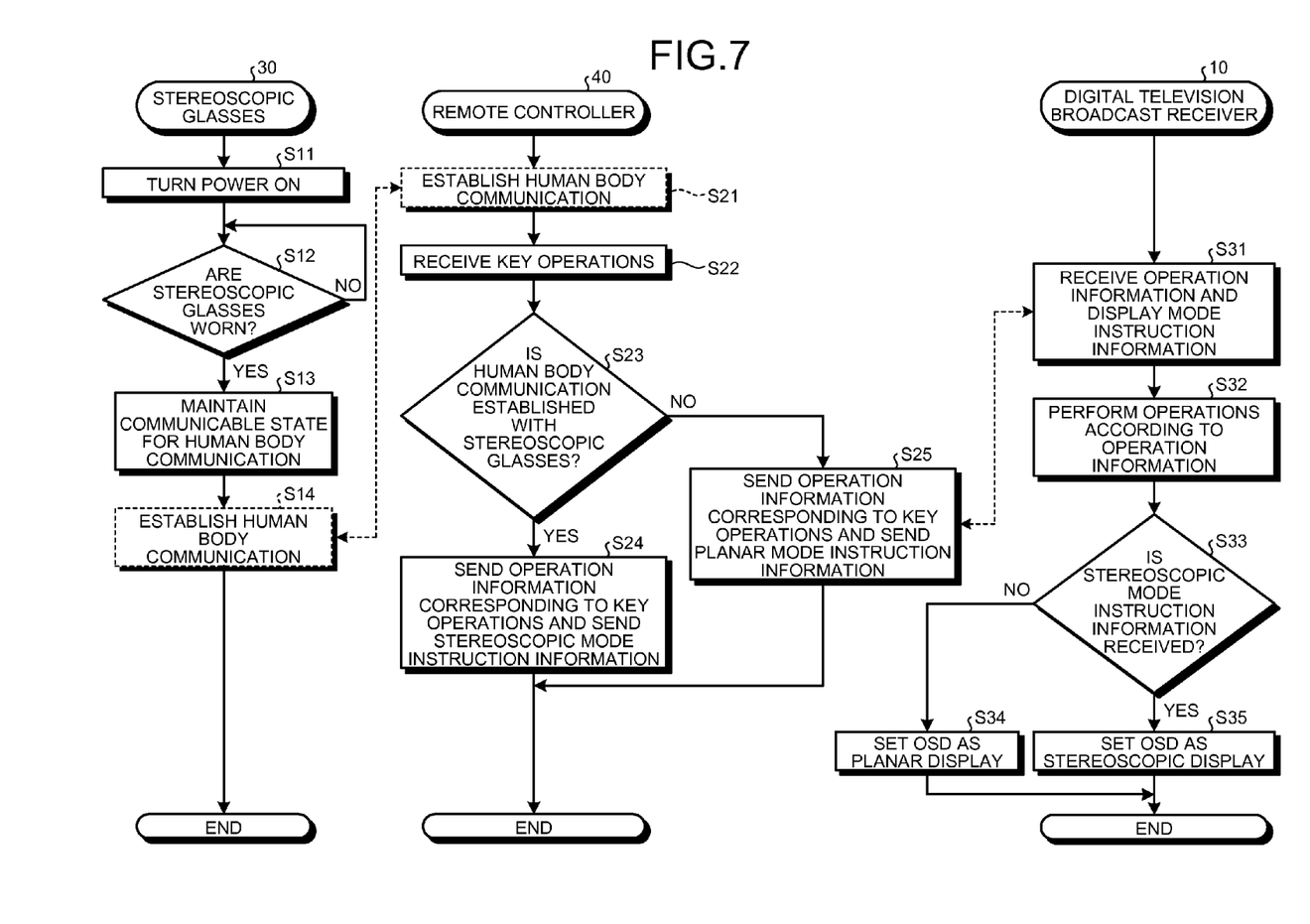
FIG. 7 is an example flowchart for explaining the operations performed by the digital television broadcast receiver according to the first embodiment in the first embodiment.

Explained below with reference to FIG. 7 are the operations performed by the digital television broadcast receiver 10 according to the present embodiment. FIG. 7 is a flowchart for explaining the operations performed by the digital television broadcast receiver 10 at the time when the remote controller 40 is operated.

First, if the user who intends to watch the digital television broadcast receiver 10 wears the stereoscopic glasses 30, then the user presses a power source button (not illustrated) of the stereoscopic classes 30. Once the constituent elements of the stereoscopic classes 30 start running as a result of turning ON the power (S11), the control module 34 monitors the conductive state of the human body communication module 33 with respect to the electrodes 30c and determines whether the user wears the stereoscopic classes 30, and waits until it is confirmed that the user wears the stereoscopic glasses 30 (No at S12).

When it is confirmed that the user wears the stereoscopic classes 30 (Yes at S12), the control module 34 sends an existence confirmation command to the transmission path (human body) via the human body communication module 33 so that a communicable state is maintained with respect to the human body communication module 43 of the remote controller 40 (S13).

Herein, for example, if the user wearing the stereoscopic glasses 30 holds the remote controller 40, then communication is established between the human body communication module 33 of the stereoscopic glasses 30 and the human body communication module 43 of the remote controller 40 (S14 and S21).

When a user either wearing or not wearing the stereoscopic glasses 30 operates the keys of the remote controller 40, the operation receiving module 41 notifies the control module 44 about the operated keys (S22) Upon receiving the notification about the operated keys, the control module 44 confirms the state of the human body communication module 43 and determines whether communication is established between the human body communication module 43 and the human body communication module 33 of the stereoscopic glasses 30 (S23).

If it is confirmed that communication is established with the human body communication module 33 (Yes at S23), then the control module 44 determines that the user wearing the stereoscopic glasses 30 is operating the remote controller 40. In that case, the control module 44 sends the operation information corresponding to the key operations and sends the stereoscopic mode instruction information using the sending module 42 (S24).

On the other hand, if it is determined that communication is not established with the human body communication module 33 (No at S23), then the control module 44 determines that the user not wearing the stereoscopic glasses 30 is operating the remote controller 40. In that case, the control module 44 sends the operation information corresponding to the key operations and sends the planar mode instruction information using the sending module 42 (S25).

Meanwhile, in the digital television broadcast receiver 10, when the control module 22 receives the operation information and the display mode instruction information (stereoscopic mode instruction information or planar mode instruction information) via the receiving module 24 (S31), it performs operations according to the commands specified in the operation information (S32). Subsequently, the control module 22 determines whether the display mode instruction information is the stereoscopic mode instruction information or the planar mode instruction information (S33).

If the display mode instruction information is determined to be the planar mode instruction information (No at S33), then the control module 22 sets the disparity amount extracted by the disparity amount extracting module 153 to zero value so that the OSD can be displayed as planar video (S34) and ends the operations. On the other hand, if the display mode instruction information is determined to be the stereoscopic mode instruction information (Yes at S33), then the control module 22 instructs the disparity amount extracting module 153 of the synthesis processing module 15 to perform normal operations so that the OSD can be displayed as a stereoscopic video (S35) and ends the operations.

In this way, according to the present embodiment, based on the communication state of human communication between the stereoscopic glasses 30 and the remote controller 40, the control module 44 of the remote controller 40 determines whether a user wearing the stereoscopic glasses 30 is operating the remote controller 40. Besides, based on whether the stereoscopic glasses 30 are worn or not by the user operating the remote controller 40, the control module 44 switches the display mode of the OSD signal (video signal) between the planar video mode and the stereoscopic video mode. Hence, the OSD can be projected in a suitable display mode to the user thereby enabling achieving enhancement in OSD viewability.

Moreover, since the display mode instruction information (stereoscopic mode instruction information or planar mode instruction information) is sent along with the operation information from the remote controller 40, it becomes possible to make use of the existing configuration of a commonplace remote controller.

Meanwhile, in the present embodiment, although the display mode of the OSD is switched between the planar video mode and the stereoscopic video mode based on whether the stereoscopic glasses 30 are worn or not by the user operating the remote controller 40, it is also possible to change the display mode of the video signal itself.

More particularly, upon receiving the stereoscopic mode instruction information, the control module 22 of the digital television broadcast receiver 10 controls the signal processing module 14 to convert the video signal for planar display into the video signal for stereoscopic display. Thus, the video signal itself can be changed to a video signal for stereoscopic display. Similarly, upon receiving the planar mode instruction information, the control module 22 controls the signal processing module 14 to convert the video signal for stereoscopic display into the video signal for planar display. Thus, the video signal itself can be changed to a video signal for planar display. Meanwhile, when the video signal is changed to the video signal for planar display, the OSD signal is output as an OSD signal for planar display by the synthesis processing module 15. Hence, both the video signal and the OSD signal can be displayed as signals for planar display.

When communication is established between the human body communication module 33 of the stereoscopic glasses 30 and the human body communication module 43 of the remote controller 40, the identification information of the stereoscopic glasses 30 is sent from the remote controller 40 to the digital television broadcast receiver 10. Due to such a configuration, it becomes possible to identify the stereoscopic glasses 30 that are worn by the user operating the remote controller 40. In that case, for example, it becomes possible to individually control the opening/closing intervals of the shutters in the stereoscopic glasses 30 that are worn by the user operating the remote controller 40. As a result, it becomes possible to ensure that only the user wearing the stereoscopic glasses 30 is able to watch the OSD displayed on the video display module 19.

Given below is the explanation regarding a second embodiment. In the first embodiment described above, the OSD display mode is controlled by configuring the remote controller 40 to send the planar mode instruction information/stereoscopic mode instruction information. On the other hand, in the present embodiment, the OSD display mode is controlled by configuring the stereoscopic glasses 30 to send the planar mode instruction information/stereoscopic mode instruction information. Herein, the constituent elements identical to those in the first embodiment are referred to by the same reference numerals and the explanation thereof is not repeated.

In the digital television broadcast receiver 10 according to the present embodiment, the stereoscopic glasses 30 and the remote controller 40 are respectively substituted by a stereoscopic glasses 50 and a remote controller 60. Moreover, in the digital television broadcast receiver 10 according to the present embodiment, the default setting is to set the disparity amount extracted by the disparity amount extracting module 153 to zero value, i.e., to display the OSD as planar video. Given below is the explanation regarding the stereoscopic glasses 50 and the remote controller 60 that are the characteristics according to the present embodiment.

Figure 8:
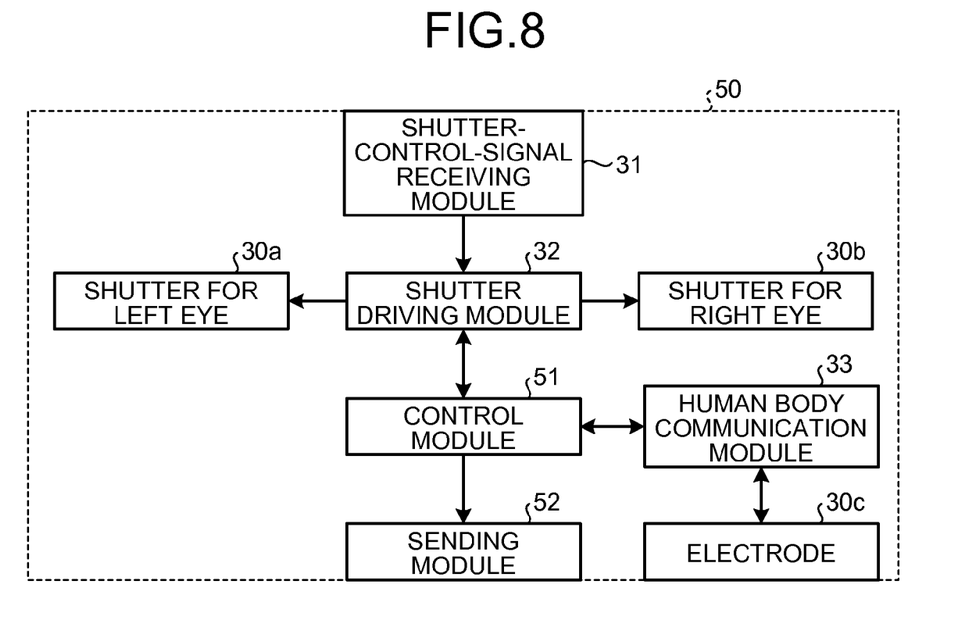
FIG. 8 is an example block diagram of a configuration of stereoscopic glasses according to a second embodiment.

FIG. 8 is a block diagram of a configuration of the stereoscopic glasses 50. As illustrated in FIG. 8, the stereoscopic glasses 50 comprise the shutter-control-signal receiving module 31, the shutter driving module 32, the human body communication module 33, a control module 51, and a sending module 52.

The control module 51 has identical functions to those of the control module 34 and comprehensively controls the operations of the constituent elements of the stereoscopic glasses 50. More particularly, the control module 51 monitors the conductive state of the human body communication module 33 with respect to the electrodes 30c and determines whether the user wears the stereoscopic glasses 50. Moreover, upon confirming that the stereoscopic glasses 50 are worn, the control module 51 sends an existence confirmation command via the human body communication module 33 so that communication is established with the remote controller 60.

When it is confirmed that communication with the human body communication module 43 of the remote controller 40 is established, the control module 51 determines that the user wearing the stereoscopic glasses 50 is operating the remote controller 60 and then sends the stereoscopic mode instruction information using the sending module 51. When the established communication with the human body communication module 43 of the remote controller 40 is detected to have been disconnected, the control module 51 determines that the stereoscopic glasses 50 has been taken off or that the remote controller 60 is not being operated any more, and then sends the planar mode instruction information using the sending module 52.

The sending module 52 sends predetermined signals (stereoscopic mode instruction information, planar mode instruction information, etc.) under the control of the control module 51. Herein, the communication mode implemented by the sending module 52 is identical to that implemented by the receiving module 24 and can be a wireless communication mode such as the infrared communication mode or Bluetooth (registered trademark).

Figure 9:
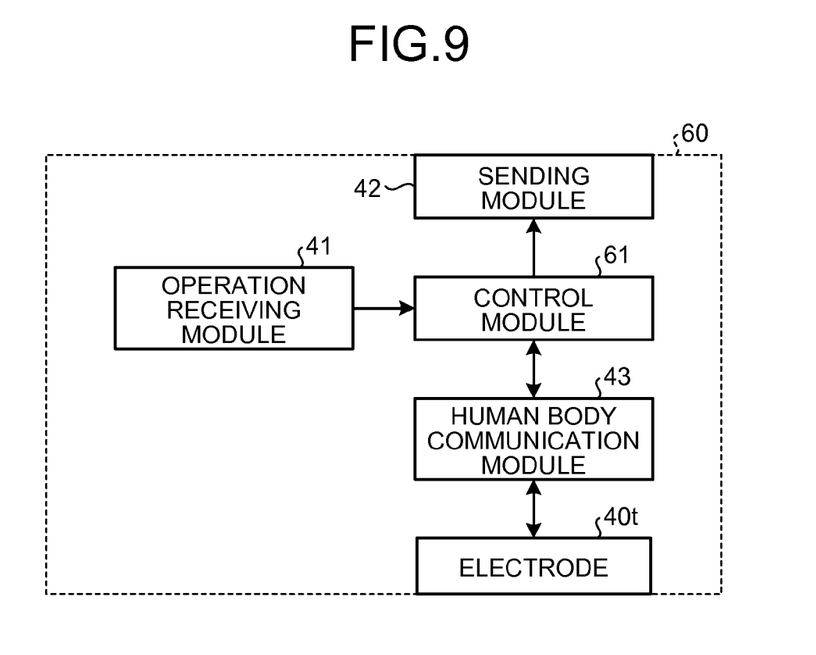
FIG. 9 is an example block diagram of a configuration of a remote controller in the second embodiment.

FIG. 9 is a block diagram of a configuration of the remote controller 60 according to the present embodiment. As illustrated in FIG. 9, the remote controller 60 comprises the operation receiving module 41, the sending module 42, the human body communication module 43, and a control module 61.

The control module 61 comprehensively controls the operations of the constituent elements of the remote controller 60. More particularly, according to the key operations received by the operation receiving module 41, the control module 61 sends, using the sending module 42, the operation information that includes commands assigned in advance to the keys that have been operated. Thus, except for the function of sending a display mode instruction signal, the control module 61 performs identical functions to the functions performed by the control module 44.

Figure 10:
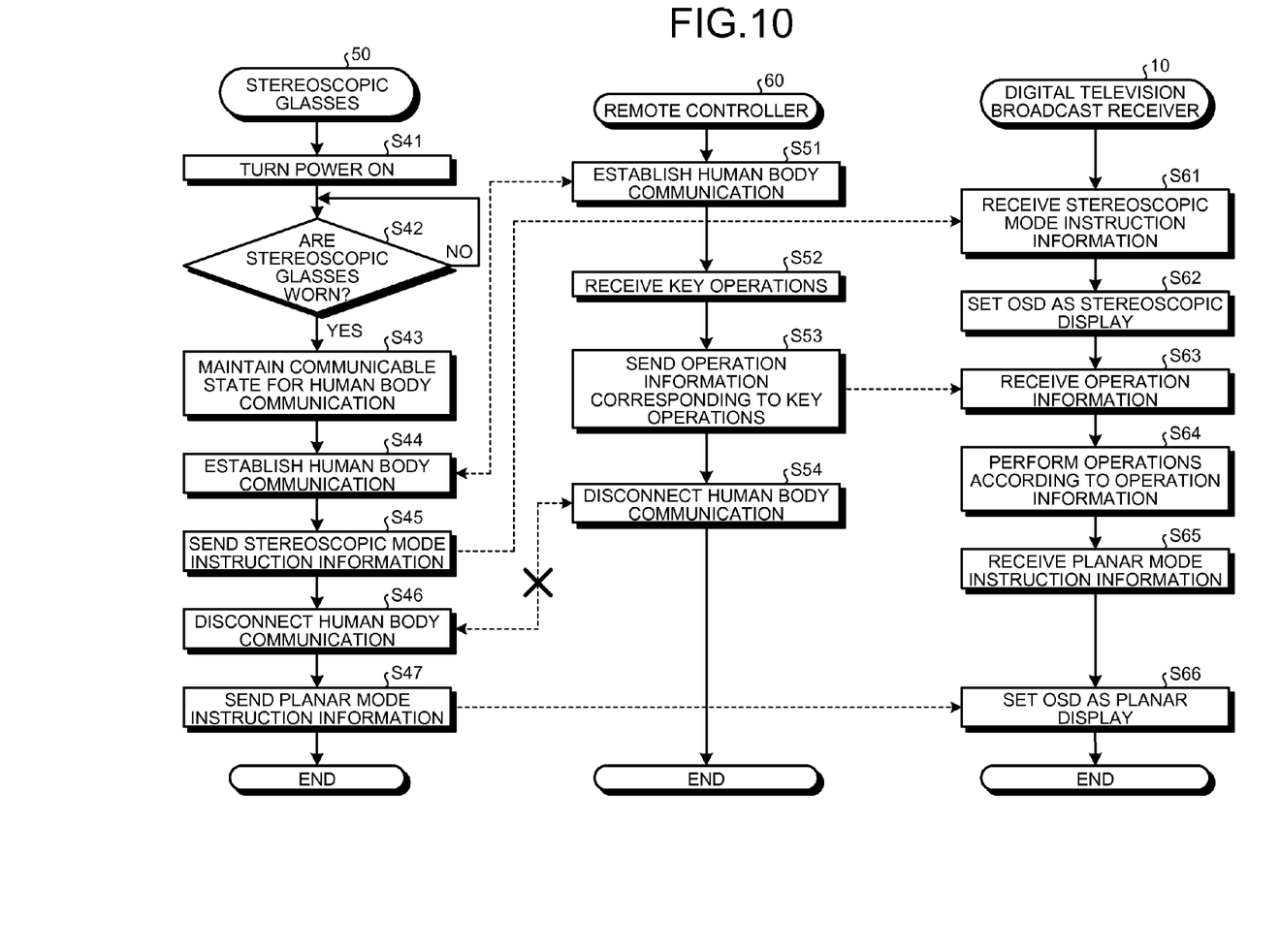
FIG. 10 is an example flowchart for explaining the operations performed by the digital television broadcast receiver in the second embodiment.

Explained below with reference to FIG. 10 are the operations performed by the digital television broadcast receiver 10 according to the present embodiment. FIG. 10 is a flowchart for explaining the operations performed by the digital television broadcast receiver 10 at the time when the remote controller 60 is operated.

First, if the user who intends to watch the digital television broadcast receiver 10 wears the stereoscopic glasses 50, then the user presses a power source button (not illustrated) of the stereoscopic glasses 50. Once the constituent elements of the stereoscopic glasses 50 start running as a result of turning ON the power (S41), the control module 51 monitors the conductive state of the human body communication module 33 with respect to the electrodes 30c and determines whether the user wears the stereoscopic glasses 50, and waits until it is confirmed that the user wears the stereoscopic glasses 50 (No at S42).

When it is confirmed that the user wears the stereoscopic glasses 50 (Yes at S42), the control module 51 sends an existence confirmation command to the transmission path (human body) via the human body communication module 33 to maintain a communicable state with respect to the human body communication module 43 of the remote controller 60 (S43).

Herein, when the user wearing the stereoscopic glasses 50 holds the remote controller 60, communication is established between the human body communication module 33 of the stereoscopic glasses 50 and the human body communication module 43 of the remote controller 60 (S44 and S51). When it is confirmed that communication with the human body communication module 33 is established, the control module 51 determines that the user wearing the stereoscopic glasses 50 is operating the remote controller 60 and sends the stereoscopic mode instruction information using the sending module 52 (S45).

In the digital television broadcast receiver 10, when the control module 22 receives the stereoscopic mode instruction information via the receiving module 24 (S61), it instructs the disparity amount extracting module 153 of the synthesis processing module 15 to perform normal operations so that the OSD can be displayed as a stereoscopic video (S62).

Meanwhile, after S51 is performed, when a user wearing the stereoscopic glasses 50 operates the keys of the remote controller 60, the operation receiving module 41 notifies the control module 61 about the operated keys (S52). Upon receiving the notification about the operated keys, the control module 61 sends the operation information corresponding to the key operations using the sending module 42 (S53).

In the digital television broadcast receiver 10, when the control module 22 receives the operation information via the receiving module 24 (S63), it performs operations according to the commands specified in the operation information (S64). At that time, the OSD that is displayer on the video display module 19 as a result of performing operations is displayed as a stereoscopic video obtained by the control performed at S62.

After S53 is performed, if the user wearing the stereoscopic glasses 50 releases the hand from the remote controller 60, then the communication between the human body communication modules 33 and 43 gets disconnected (S46 and S54). Consequently, the control module 51 of the stereoscopic glasses 50 determines that the stereoscopic glasses 50 has been taken off or that the remote controller 60 is not being operated any more, and then sends the planar mode instruction information using the sending module 52 (S47).

In the digital television broadcast receiver 10, when the control module 22 receives the planar mode instruction information via the receiving module 24 (S65), it controls the disparity amount extracting module 153 of the synthesis processing module 15 and sets the disparity amount extracted by the disparity amount extracting module 153 to zero value so that the OSD can be displayed as planar video (default state) (S66), and ends the operations.

In this way, according to the present embodiment, based on the communication state of human communication between the stereoscopic glasses 50 and the remote controller 60, the control module 51 of the stereoscopic glasses 50 determines whether a user wearing that stereoscopic glasses 50 is operating the remote controller 60. Besides, based on whether the stereoscopic glasses 50 are worn or not by the user operating the remote controller 60, the control module 51 switches the display mode of the OSD signal (video signal) between the planar video mode and the stereoscopic video mode. Hence, the OSD can be projected in a suitable display mode to the user thereby enabling achieving enhancement in OSD viewability.

For example, in the abovementioned embodiment, the time-sharing display mode is explained as an example of the mode for displaying stereoscopic videos. However, in the case of using a pair of stereoscopic glasses, it is also possible to implement other modes (for example, Xpol technology). Moreover, in the abovementioned embodiments, a pair of stereoscopic glasses of the liquid-crystal shutter type is used. However, depending on the method for displaying stereoscopic videos, it is also possible to use a pair of stereoscopic glasses with polarizing filters.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic video display apparatus comprising:
a planar video output module configured to output two-dimensional planar video;
a stereoscopic video output module configured to output video for left eye and video for right eye;
an eyeglass control module configured to project the video for left eye on a left-eye portion of stereoscopic glasses and project the video for right eye on a right-eye portion of the stereoscopic glasses; and
a display controller configured to display, in response to whether a user who is wearing the stereoscopic glasses is operating a remote controller, one of the two-dimensional planar video from the planar video output module and the video for left and right eyes on a video display screen, wherein
the display controller is configured to display, if the user who is wearing the stereoscopic glasses is operating the remote controller, the video for left and right eyes from the stereoscopic video output module on the video display screen.

2. The stereoscopic video display apparatus of claim 1, further comprising a determining module configured to determine, based on a first communication state of a first human body communication module associated with the stereoscopic glasses and a second communication state of a second human body communication module associated with the remote controller, whether the user who is wearing the stereoscopic glasses is operating the remote controller, wherein
the display controller is configured to display, if the determining module determines that the user who is wearing the stereoscopic glasses is operating the remote controller, the video for left and right eyes from the stereoscopic video output module on the video display screen.

3. The stereoscopic video display apparatus of claim 2, wherein
the determining module is associated with one of the stereoscopic glasses or the remote controller, and
wherein the display controller is further configured to select between the video output from the planar video output module and the video output from the stereoscopic video output module in response to instruction information received from the determining module.

4. The stereoscopic video display apparatus of claim 1, wherein the planar video output module and the stereoscopic video output module are further configured to output an on-screen display signal.

5. Stereoscopic glasses used with a stereoscopic video display apparatus, comprising:
- an electrode for human body communication that is located at a position to contact a user when the user is wearing the stereoscopic glasses;
- a human body communication module configured to communicate with a remote controller via a body of the user in contact with the electrode, wherein the remote controller is configured to remotely control the stereoscopic video display apparatus;
- a determining module configured to determine whether the user wearing the stereoscopic glasses is operating the remote controller based on a communication state of the human body communication module; and
- a display mode instruction module configured to instruct the stereoscopic video display apparatus to output one of a two-dimensional planar video or a three-dimensional stereoscopic video based on the determination of the determining module.

6. The stereoscopic glasses of claim 5, wherein the electrode is located at one of a temple piece or a pad portion.

7. A stereoscopic video display system comprising:
- a stereoscopic video display apparatus;
- stereoscopic glasses; and
- a remote controller configured to remotely control the stereoscopic video display apparatus;
- wherein the stereoscopic video display apparatus comprises:
- a planar video output module configured to output two-dimensional planar video;
- a stereoscopic video output module configured to output video for left eye and video for right eye;
- an eyeglass control module configured to project the video for left eye on a left-eye portion of the stereoscopic glasses and project the video for right eye on a right-eye portion of the stereoscopic glasses;

and
- a switch configured to select between the video output from the planar video output module and the video output from the stereoscopic video output module in response to display mode instruction information received from one of the stereoscopic glasses or the remote controller;
- wherein the stereoscopic glasses and the remote controller each comprise:
- an electrode for human body communication that is located at a position to contact a user when the user is wearing the stereoscopic glasses; and
- a human body communication module configured to communicate via a body of the user when in contact with the electrode; and
- wherein at least one of the stereoscopic glasses and the remote controller further comprises:
- a determining module configured to determine whether the user wearing the stereoscopic glasses is operating the remote controller based on a communication state of the human body communication module; and
- a sending module configured to send the display mode instruction information to the stereoscopic video display apparatus.

* * * * *